Patented Oct. 5, 1954

2,691,007

UNITED STATES PATENT OFFICE 2,691,007

UNSATURATED ACIDIC POLYESTER ETH-OXYLINE RESINOUS COMPOSITIONS

William E. Cass, Schenectady, N. Y., assignor to General Electric Company, a corporation of New York No Drawing. Application October 31, 1951, Serial No. 254,208

7 Claims. (Cl. 260—45.4)

This invention is concerned with novel resinous compositions of matter. More particularly, the invention relates to a composition of matter comprising (1) an acidic polymerizable polyester containing a free carboxyl group and comprising the product of reaction of a mixture of ingredients comprising a dihydric alcohol and an ethylenically alpha unsaturated alpha, beta dicarboxylic acid or anhydride and (2) a complex epoxide resin comprising a polyether derivative of a polyhydric organic compound, e. g., a polyhydric alcohol or phenol, containing epoxy groups, which, for brevity, will hereinafter be referred to as an "ethoxyline resin."

It has been disclosed in U. S. Patent 2,324,483—Castan that epoxy resins comprising the product of reaction of a phenol having at least two phenolic hydroxy groups and an epihalogenohydrin, e. g., epichlorohydrin, in which the said product contains at least two ethylene oxide groups, may be converted to the substantially thermoset stage by employing a polybasic carboxylic acid or anhydride, for instance, phthalic anhydride, as a cure accelerator. The resinous reaction products with which the polybasic carboxylic acid or anhydride is employed are generally complex resins comprising a polyether derivative of a polyhydric phenol containing epoxy groups and are commonly known as "ethoxyline resins" and are sold under the trade names of Epon or Araldite resins. Although the use of these polybasic carboxylic acids or anhydrides gives useful products, nevertheless, there are certain properties which these resins do not possess and which in many repects limit their usefulness.

I have now discovered that mixtures of the aforementioned ethoxyline resins may be prepared which are eminently useful in many applications and which have properties which are superior to the properties of mixtures of ethoxyline resins heretofore prepared and used for the same purpose. More particularly, I have found that the combination of an ethoxyline resin together with an unsaturated acidic polyester (for brevity hereinafter referred to as an "unsaturated polyester") containing a free carboxyl group and comprising the product of reaction of a mixture of ingredients comprising a dihydric alcohol and an ethylenically alpha unsaturated alpha, beta dicarboxylic acid or anhydride has properties which in many respects are superior to the properties of ethoxyline resins heretofore prepared. The combination of the above-described unsaturated polyester resin and ethoxyline resin permits modification of the ethoxyline resin whereby various properties not inherent in the ethoxyline resin themselves can be obtained. The above-described combination of resins has for its chief advantage over other ethoxyline resin combinations the fact that there is an increased speed in the rate of cure due to free radical polymerization, which being a chain process is generally more rapid than the condensation polymerization which is a stepwise process. Thus, by chemically combining ethoxyline resins with the acidic unsaturated polyester resins, one is able to approach the toughness and thermal stability of the ethoxyline resins and yet realize the rapidity of cure and desirable properties of the unsaturated polyester resin systems.

The unsaturated polyesters employed in the practice of this invention which comprise the product of reaction of a mixture of ingredients comprising a dihydric alcohol and a polymerizable ethylenically alpha unsaturated alpha, beta dicarboxylic acid are not to be confused with saturated alkyd resins, for instance, the glyceryl-phthalate type resins, since these resins lack unsaturation and are therefore incapable of free-radical polymerization. The use of the latter alkyd resins in place of my acidic unsaturated polyesters with the ethoxyline resins will not give the same results. Neither are my alpha unsaturated polyesters to be confused with the air drying alkyds of the drying oil acid modified glyceryl-phthalate type widely used for surface coating purposes. The drying oil acid modified alkyd resins are air drying in character and do not satisfactorily "through-cure" in thick sections even when using peroxide or other free-radical producing catalysts. On the other hand, the alpha unsaturated polyesters employed in the practice of the present invention do show the property of curing to solid, infusible products in thick sections on heating with free-radical producing catalysts.

In the preparation of the acidic unsaturated polyesters, various dihydric alcohols may be employed. Among such alcohols may be mentioned, for example, ethylene glycol, diethylene glycol, propylene glycol, dipropylene glycol, 1,4-butanediol, etc. Examples of ethylenically alpha unsaturated alpha, beta dicarboxylic acids which may be used in making the aforesaid acidic polyesters are, for instance, maleic, fumaric, itaconic, etc., acids. If available, anhydrides of these dicarboxylic acids may be employed without departing from the scope of the invention and for brevity the description of the invention when referring to the ethylenically unsaturated dicarboxylic acid, is intended to include anhydrides thereof.

In some cases, instead of using an unmodified acidic polymerizable polyester of the type described above, I may use an unsaturated polyester which has been internally modified by replacing a part, say, up to about 90 mol per cent of the unsaturated dicarboxylic acid with a non-ethylenic dicarboxylic acid, e. g., a saturated aliphatic polycarboxylic acid such as succinic, adipic, glutaric, azelaic, sebacic, etc., acids; saturated cycloaliphatic dicarboxylic acids, aromatic dicarboxylic acids, e. g., phthalic, terephthalic, isophthalic, or with anhydrides of such acids, if available.

The ethoxyline resins defined above as being a complex epoxide resin comprising a polyether derivative of a polyhydric organic compound, e. g., polyhydric alcohol or phenol, containing epoxy groups are disclosed in various places in the art. Among such references may be mentioned the aforesaid Castan Patent 2,324,483, as well as Castan Patent 2,444,333, British Patent 518,057, and British Patent 579,698. For the most part, these ethoxyline resins are based on the resinous product of reaction between an epihalogenohydrin, for instance, epichlorohydrin, and a phenol having at least two phenolic hydroxy groups, for example, bis-(4-hydroxyphenyl) dimethylmethane. U. S. Patents 2,494,295; 2,500,600 and 2,511,913 describe other examples of ethoxyline resinous compositions which may be employed in the practice of the present invention. By reference, the aforementioned patents are intended to be included as part of the present description of the ethoxyline resins used and, for brevity, the ethoxyline will not be described other than that they contain more than one ethylene oxide group, e. g., from 1 to 2 or more epoxide groups per molecule and may be prepared by effecting a reaction between a polyhydroxy phenol or alcohol, for example, hydroquinone, resorcinol, glycerine, or condensation products of phenols with ketones, for instance, bis-(4-dihydroxydiphenyl)-2,2-propane, with epichlorohydrin. For example, the reaction of epichlorohydrin with bis-(4-hydroxyphenyl)-2,2-propane may be formulated as follows:

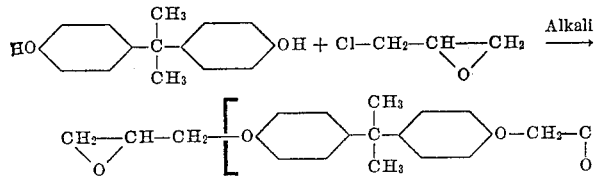
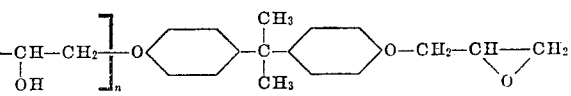

where $n$ has an average value varying from around zero to about 7. Many of these ethoxyline resins are sold under the name of Epon resins by Shell Chemical Corporation or Araldite resins by the Ciba Company. Data on the Epon resins are given in the table below:

TABLE I

| Epon No. | Epoxide Equivalent | Approximate Esterification Equivalent | M. P., 0° C. |
|---|---|---|---|
| RN-34 | 225-290 | 105 | 20-28. |
| RN-48 | 192 | 80 | 9. |
| 1064 | 300-375 | 105 | 40-45. |
| 1062 | 140-165 | | Liquid. |
| 1004 | 905-985 | 175 | 97-103. |
| 1007 | 1,600-1,900 | 190 | 127-133. |
| 1009 | 2,400-4,000 | 200 | 145-155. |
| 1001 | 450-525 | 130 | 64-76. |

The complex epoxides used with the above-described unsaturated polyesters contain epoxide groups or epoxide and hydroxyl groups as their functional groups and are generally free from other functional groups such as basic and acidic groups.

Various methods may be used to prepare the acidic polymerizable polyesters employed with the ethoxyline resins. In order to obtain these acidic unsaturated polyesters, I preferably employ 0.8 to 2.0 mols of unsaturated dicarboxylic acid per mol of dihydric alcohol and preferably from 1 to 1.5 mols of dicarboxylic acid. If less than 1 mol of dicarboxylic acid or anhydride per mol of dihydric alcohol is used, for example, 0.8 mol of dicarboxylic acid, the esterification reaction must be interrupted before completion in order to obtain the acidic polyester mixture necessary for the practice of this invention. In this latter case, the polyester mixture contains an excess of hydroxyl groups over carboxyl groups. In general, I prefer to use at least one mol of dicarboxylic acid or anhydride per mol of dihydric alcohol. In preparing the acidic polyesters herein employed, it is desirable that the acid number of the polyesters exceed about 50 and preferably be within the range of from about 75 to 200.

These unsaturated polyesters may be generally prepared by heating a mixture of the polyhydric alcohol and the unsaturated dicarboxylic acid or anhydride in the proper molar concentrations at elevated temperatures of the order of from about 150° to 225° C. for a period of time ranging from about 1 to 3 more hours. A polymerization inhibitor such as t-butyl catechol is advantageously added. Reaction is preferably conducted until the acid number is within the desired range so as to give the acidic unsaturated polyesters required for use with the ethoxyline resins. The examples below indicate various manners in which the acidic unsaturated polyesters may be prepared, and it is believed that persons skilled in the art will have little difficulty in determining the method for preparing these unsaturated polyesters.

The proportion of unsaturated polyester and ethoxyline resin employed may be varied within wide limits depending on the application for which the mixture is intended, the type of unsaturated polyester used, the type of ethoxyline resin employed, etc. Generally, I prefer to use the unsaturated polyester in an amount ranging from about 5 to 75 per cent, preferably from about 30 to 60 per cent of the total weight of the ethoxyline resin and the unsaturated polyester. I find it advantageous to employ the polyester and ethoxyline resins in such proportions that there is present in the mixture from approximately 0.8 to 1.2 polyester acid equivalents for each equivalent of epoxide.

The method by which the unsaturated polyester and the ethoxyline resin may be combined can, of course, be varied and presents no particular difficulty. Generally, it is desirable to heat the polyester resin and while in a fluid condition to add the ethoxyline resin (also heated, if necessary, to a fluid state) and thereafter heat the mixture of ingredients with stirring at temperatures of from 100° to 200° C. for varying lengths of time until a homogeneous composition is obtained. Heating of the mixture effects combination of carboxyl groups of the unsaturated polyester with the epoxide groups of the ethoxyline resin. Continued heating at temperatures ranging from 125° to 200° C. generally results in gelation of the mixture. However, the condensation reaction can be interrupted by cooling the mixture to room temperature to give a fusible, soluble resin in an intermediate state of condensation having good shelf life. It will, of course, be apparent to those skilled in the art that the attainment of the gelled state will be accelerated by the temperature at which the mixture of ingredients is heated and the length of time of heating will also affect this. The aforesaid partially reacted composition can be subsequently employed in such applications as coating, molding, laminating, or surface coating or for adhesive purposes (using solutions thereof if necessary). Subsequent heating of the partially reacted, precondensed composition generally results in conversion thereof to the insoluble, infusible cured state. This curing by heat alone of the precondensed composition occurs most rapidly in surface coating applications, in which thin films of the composition are heated in air to elevated temperatures of the order of from 150° to 300° C.

For curing the precondensed compositions in bulk, in many applications improved results are obtained if a free-radical producing catalyst be incorporated in the composition. Examples of such polymerization accelerators which may be used in combination with the ethoxyline resin and the unsaturated acidic polyesters are aliphatic acyl peroxides, e. g., acetyl peroxide, lauroyl peroxide, stearoyl peroxide, etc., peroxides of the aromatic or of the aliphatic-aromatic series, e. g., benzoyl peroxide, acetyl benzoyl peroxide, etc., tertiary butyl perbenzoate, tertiary butyl hydroperoxide, cyclohexyl hydroperoxide-1, azo compounds, e. g., alpha, alpha' azo bis-isobutyronitrile, etc. Generally, organic peroxides such as benzoyl peroxide or tertiary butyl perbenzoate, are the preferred catalysts. Any suitable amount of polymerization catalyst may be used, but, in general, the catalyst concentration will be within the range of from about 0.1 to 2 per cent, by weight, based on the weight of the polymerizable acidic polyester. The rate of polymerization and the properties of final product vary with the time, temperature, and with the catalyst concentration. Polymerization and condensation of the mixture of resins containing the aforementioned ethoxyline resins may be effected at elevated temperatures, for example, from about 80° to 150° C.

If desired, other copolymerizable materials as, for instance, other terminally ethylenically unsaturated monomers containing the $CH_2=C<$ grouping, for example, styrene, methyl methacrylate, ethyl acrylate, vinyl acetate, diallyl phthalate, etc., may be added to the mixture of ethoxyline resin and acidic polymerizable polyester or to the precondensed mixture thereof in order to further modify the properties of the material.

In order that those skilled in the art may better understand how the present invention may be practiced, the following examples are given by way of illustration and not by way of limitation. All parts are by weight.

Example 1

About 98 grams (1 mol) maleic anhydride were heated with 62 grams (1 mol) ethylene glycol for one hour at 185°–220° C. under an inert atmosphere of hydrogen with constant stirring. A small amount of an aqueous distillate collected. The resulting resin had an acid number of 95. When about 20 parts of the above-identified acidic unsaturated polyester were heated with 30 parts of an ethoxyline resin identified as Epon 1064, the said mixture having incorporated therein about 0.01 part quinone as polymerization inhibitor, for 1.5 hours at 150°–160° C. with occasional stirring, there was obtained a solid precondensed product of increased viscosity and the acid number of the material was established to be 3.0.

When a sample of the precondensed mixture of the polymerizable acidic polyester and the ethoxyline resin was placed on a glass slide and heated on a 200° C. hotplate, the sample slowly gelled on the surface, the bulk of the sample remaining fluid. This indicated that free-radical polymerization catalyzed by air oxygen was occurring. Further evidence for free radical polymerization was obtained by mixing some of the precondensed product (in powdered form) obtained above with a small amount of benzoyl peroxide. When this mixture was placed on a glass slide and heated on a 200° C. hotplate, it gelled immediately and completely. Similar results were obtained using tertiary butyl hydroperoxide as a catalyst.

A solution was prepared from the precondensed mixture of ethoxyline resin and acidic unsaturated polyester prepared above by dissolving the mixture in acetone containing a small amount of benzene. A glass slide was dipped in the solution and the coated slide heated for 15 minutes at 200° C. At the end of this time the coating had cured to a hard, nearly colorless film, and when further heated at 200° C. for 16 hours showed only slight yellowing without further change. This indicates clearly the excellent heat resistance of the coating. Soaking the heat-treated slide in acetone for one hour only slightly softened the film.

The above solution of intercondensed ethoxyline resin and unsaturated polyester resin was also tested for its adhesive properties by dipping thin copper strips in the solution and then curing samples of the coated strips for 20 minutes, 1 hour, 2 hours and 18 hours at 200° C. All the coatings were flexible after such heat treatment and showed no tendency to craze on bending the copper. All coatings also exhibited good adhesion to the copper with the exception of the sample heated at 200° C. for 18 hours.

Example 2

To test the compatibility of a thermoplastic resin, such as a polyvinyl formal resin, with the precondensed mixture of ethoxyline and acidic polyester resins, the following composition was prepared. The precondensed material (6 parts) obtained in Example 1 was mixed with a polyvinyl formal resin (3 parts) identified as Formvar resin 15/95, and 50 parts of ethylene dichloride as a solvent. Copper strips were dipped in the above solution and thereafter heated for 1½ hours at 200° C. The resulting cured films were clear (indicating compatibility), flexible and adherent. They were somewhat tougher than the films previously prepared without the added polyvinyl formal resin.

A molding resin was also prepared from the precondensed mixture of ethoxyline resin and unsaturated polyester resin described in Example 1 by mixing 9 parts of this mixture, which was first dissolved in a small amount of acetone, with 15 parts Catalpo clay, 6 parts powdered asbestos and 0.18 part benzoyl peroxide. A similar mixture was also prepared with the exception that only the original unsaturated polyester was used in place of the precondensed mixture of ethoxyline resin and unsaturated polyester. In each case, the solvent was allowed to evaporate from both of the above mixtures and they were broken into small pieces. The products were press molded into thin disks at 150° C. for about 1 minute. The disks were then removed and post cured in an oven at 150° C. for 20 minutes. The disks from the precondensed mixture of ethoxyline resin and unsaturated polyester resin were more flexible at 100°–150° C. than the disks from the unsaturated polyester itself. At room temperature, although both disks were rigid, the one comprising the precondensed mixture was much stronger.

*Example 3*

A mixture of 43 parts of an ethylene glycol maleate polyester prepared as described in Example 1 (but having an acid number of 106) and 57 parts of an ethoxyline resin known as Epon 1064 was heated in the presence of a small amount of quinone as inhibitor at about 150° C. for 1.75 hours and then poured on a cool, flat surface to interrupt the condensation reaction. The product had an acid number of 2.5 corresponding to 94.5% reaction between the ethoxyline resin and the polymerizable acidic polyester.

A 31 per cent solids solution in a solvent mixture consisting of isophorone, cresol and solvent naphtha of the above-described precondensed resin of Example 3 was applied to copper wire as a coating using the regular wire enamel coating techniques. It was found that this material when applied to the copper wire was resistant to transformer oils, as, for example, Pyranol oil (which composition comprises mixtures of chlorinated diphenyl and diphenyl ethers) at 80° C. under conditions which ordinarily soften the usual wire enamel.

A precondensed combination of 50 parts ethoxyline resin Epon 1064 and 50 parts of an ethylene glycol maleate polyester resin similar to that described in Example 3 was made into a solution using acetone as a solvent. To this solution was added 1 per cent, by weight, benzoyl peroxide based on the weight of the precondensed mixture of resins. The solution was painted on clean steel bars, the solvent allowed to evaporate for two hours at room temperature and then the bars were clamped together and cured one hour at 100° C. and then one hour at 125° C. Tests on the bond indicated that the shear and impact strengths of the bond were good.

An acetone solution of 90 parts of a precondensed mixture of ethoxyline resin and ethylene glycol maleate polyester resin similar to that described in Example 3, 10 parts diallyl phthalate and 1 part ditertiary butyl diperphthalate was prepared. Glass cloth was dipped in the solution and the solvent allowed to evaporate. Several layers of the treated cloth were press-cured 10 minutes at 125° C. and then 15 minutes at 150° C. Following this the laminate was oven cured one hour at 155° C. The resulting laminate was rigid and the resin showed good bonding characteristics to the glass fibers.

*Example 4*

In this example, a precondensed resin was prepared by heating a mixture of 42 parts of ethoxyline resin Epon 1064 and 58 parts of an unsaturated polyester comprising the reaction product of ethylene glycol and fumaric acid (1 to 1 molar ratio; acid number 103) for 1.3 hours at 155–165° C. An acetone solution of 91 parts of this precondensed resin, 9 parts diallyl phthalate and 1.1 parts ditertiary butyl diperphthalate was used to impregnate glass cloth. After evaporation of the solvent, the impregnated cloth was practically tack-free. The laminated cloth was press-cured 50 minutes at 125° C. and then oven-cured at one hour at 125° C. and one hour at 150° C. The laminate was translucent and showed good flexural strength indicating that the resin wet the glass fibers well.

*Example 5*

An acidic polymerizable polyester was prepared by heating together 6 mols fumaric acid and 6.36 mols ethylene glycol for 6.5 hours at 157°–231° C. The resulting polyester had an acid number of 54. The unsaturated polyester was inhibited after cooling with 0.056 per cent, by weight, thereof of quinone. A mixture of 76 parts of this polyester preheated to 100° C. and 24 parts of an ethoxyline resin identified as Epon 1064, also preheated to 100° C., was heated rapidly with stirring to 150° C. The reaction mixture was maintained at 150°–160° C. for two hours, at the end of which time the acid number of the precondensed product was 21.

A molding compound was prepared from the following ingredients:

23 parts precondensed ethoxyline-polyester resin of Example 5
15 parts prepolymerized diallyl phthalate [1]
0.76 part ditertiary butyl diperphthalate
34 parts chopped glass fibers
10 parts powdered calcium carbonate
8 parts pulverized mica
10 parts white clay

[1] The diallyl phthalate was partially polymerized by blowing air through it at a temperature of about 140°–150° C. for one hour.

The mixture of resins and the peroxide catalyst were dissolved in acetone by warming and stirring. The glass fibers and inorganic fillers were incorporated by mixing in a mortar using acetone as a dispersing agent. After evaporation of the acetone, the above mixture was compression molded one minute at 150° C. The resultant molding was more flexible than a similar molding using a mixture of the unsaturated polyester and prepolymerized diallyl phthalate alone, and was more translucent in appearance indicating better wetting of the fillers.

*Example 6*

About 48 parts of ethylene glycol maleate polyester (acid number 106), similar to that described in Example 1 and containing a small amount of quinone and 52 parts of ethoxyline resin Epon 1001 were each heated to about 125° C. The preheated ingredients were mixed together and heated with stirring at a temperature of about 160°–170° C. for about 40 minutes. At the end of this time, the partially condensed reaction mass was cooled by pouring on a clean cool surface to prevent further condensation. The solid product thus obtained had an acid number of 22. Solutions of this precondensed composition can be employed as a coating and impregnating agent for asbestos tape in the manner described and claimed in the copending application of Paul O. Nicodemus, Serial No. 254,145, filed concurrently herewith and assigned to the same assignee as the present invention. Such tapes are eminently suitable as electrical insulating materials for electrical conductors used in electrical motors capable of operating at relatively high temperatures.

*Example 7*

In this example a series of unsaturated polyesters were prepared using mixtures of ethylene glycol, maleic anhydride, and adipic acid. In the preparation of the aforesaid polyesters, the maleic and adipic residues were present in equimolar amounts. In all polyesters, an excess of acid groups over hydroxyl groups was employed. The polyesters were prepared in an apparatus equipped with stirring means. A small amount of p-tertiary butyl catechol was added as a polymerization inhibitor during the formation of the polyesters. During the reaction a slow stream of purified hydrogen was bubbled through the mixture. The exit gases were passed upward to a short column and then downward to a water-cooled condenser to condense the water produced by esterification. The data on the various polyesters prepared in accordance with the procedures described are given in the following Table II.

TABLE II

*Preparation and properties of polyesters*

| Sample Number Polyester | Ethylene,[1] Mols | Glycol, Grams | Hours Cooking Time | Acid Number |
|---|---|---|---|---|
| 1 | 1.33 | 82.5 | 2.0 | 250 |
| 2 | 1.5 | 93 | 2.5 | 190 |
| 3 | 1.6 | 99 | 3.0 | 154 |
| 4 | 1.67 | 103.5 | 2.75 | 140 |
| 5 | 1.75 | 108.5 | 8.5 | 94.3 |
| 6 | 1.9 | 118 | 8.5 | 65.3 |

[1] In all cases, 98 g. (1 mol) maleic anhydride and 146 g. (1 mol) adipic acid were employed. p-Tert. butyl catechol (0.1 g.) was added to the reaction mixture in each case, and the cooking temperature ranged from about 180°–190° C.

*Example 8*

A mixture of 26.5 grams of Epon resin RN–34, 36.4 grams of polyester No. 3 (see Example 7) and 0.2 gram of benzoyl peroxide was heated for 6 hours at 100° C. to give a gelled product. This gel was heated further for 57 hours at 150° C. to give a product which was tack-free, flexible and very impact-resistant.

*Example 9*

A mixture of 13.2 grams of Epon resin RN–34, 30 grams of polyester No. 5 (see Example 7) and 0.22 gram of benzoyl peroxide was heated for 39 hours at 100° C. to give a gelled flexible polymer with a slightly sticky surface. This material was heated for an additional 15 hours at 150° C. to give a sample which was tack-free, flexible and highly impact-resistant. This material was practically indestructible when subjected to repeated hammer blows.

*Example 10*

In this example, 13.2 grams of Epon RN–34, 43 grams of the unsaturated polyester described as polyester 6 (see Example 7) and 0.62 gram of benzoyl peroxide were heated together for 24 hours at 100° C. to give a gelled material. The sample was further heated at 150° C. for 15 hours, at the end of which time the sample was tack-free, flexible and again highly impact-resistant. The tear strength of the latter material was somewhat lower than the products obtained from using unsaturated polyesters 3 and 5 described in Examples 8 and 9.

It should be noted that the reaction mixtures comprising the ethoxyline resins mixed with low molecular weight unsaturated polyesters gel more quickly and give harder products than those obtained using higher molecular weight unsaturated polyesters. The higher molecular weight polyesters, however, give more impact-resistant products.

For comparison of the properties with those found in Examples 8, 9 and 10 described above, polyesters 1 to 6 (see Example 7) were heated at 100° C. with 1 per cent, by weight, thereof benzoyl peroxide omitting the ethoxyline resin. It was found that polyester 1 did not gel in 113 hours, polyester 2 gelled in less than 17 hours, and polyester 6 gelled in 15 to 30 minutes. The products of polyesters 2 through 6 were all soft and cheesy after curing indicating the advantage of using the combination of the ethoxyline resins with the unsaturated polyesters.

*Example 11*

About 13.3 grams of Epon resin RN–34 were mixed with about 19 grams of polyester No. 4 described in Example 7 and to this mixture were added various amounts of styrene. In all cases 1 per cent benzoyl peroxide, based on the total weight of the polyester and the styrene, was added and the samples were cured one hour at 100° C. and then 15 hours at 150° C. With 15, 10 and 6.3 grams of styrene, the products obtained were hard and brittle. With 4.8, 3.8 and 2.8 grams of styrene, the products became progressively more impact-resistant and somewhat softer and more flexible. Similar results were obtained when polyesters Nos. 5 and 6 described in Example 7 were employed in place of polyester 4 used in Example 11.

*Example 12*

A mixture of 42 grams of polyester No. 4 described in Example 7, 29 grams Epon resin RN–34, 14 grams monomeric methyl methacrylate and 0.5 gram of tertiary butyl perbenzoate was heated for 7 hours at 100° C. and 15 hours at 150° C. The resulting product was clear, somewhat flexible and somewhat softer than a similar product containing styrene in approximately an equivalent amount.

It will, of course, be apparent to those skilled in the art that instead of the ethoxyline resins employed above, other types of ethoxyline resins, examples of which have been given in the patents described previously, may be used without departing from the scope of the invention. In addition, other acidic unsaturated polyesters obtained by reaction of a dihydric alcohol and an ethylenically unsaturated alpha, beta dicarboxylic acid or anhydride may be used in place of the polyesters disclosed in the preceding examples.

The compositions of matter herein described have utility in many applications. As pointed out above, various useful solutions of the mixtures of the unsaturated polyesters and the ethoxyline resins or precondensed products from such mixtures may be prepared by using different low boiling solvents. In addition to the solvents described previously, it has been found that methyl ethyl ketone, ethyl cellosolve, cyclohexanone, cresylic acid, diacetone alcohol, isophorone, etc. may be used. Generally, aromatic diluents may also be added to the solvents as, for example, benzene, toluene, solvent naphtha, etc.

When solutions of the mixtures of resins or precondensed products therefrom are prepared, the solutions may be used as surface coatings, as adhesives, as impregnating agents for various sheet materials including sheets of cloth, paper, asbestos, mica, etc. Laminated products may be prepared by treating the sheet material with the particular resinous solution and evaporating substantially all the solvent and thereafter superposing the sheets upon each other and molding the assembly under heat and pressure for a time sufficient to cure the laminated product. In such instances, temperatures of the order of about 100° to 200° C. are advantageously used. As pointed out previously, various molded parts may also be prepared using the mixture of resins per se or precondensed products therefrom and incorporating a filler therein. If desired, the filler may be placed in a solution of the mixture of resins or precondensed mixture of resins and the solvent thereafter evaporated to give a filler material coated with the resinous material. Among such fillers may be mentioned various clays, titanium dioxide, iron oxide, carbon, graphite, asbestos, glass fibers, etc.

What I claim as new and desire to secure by Letters Patent of the United States is:

1. The product of heat interaction of a mixture of ingredients consisting essentially of (1) an acidic polymerizable polyester having an acid number between 75 and 200 and containing a free carboxyl group, and comprising the product of reaction of a mixture of ingredients consisting essentially of (a) a dihydric alcohol selected from the class consisting of ethylene glycol, diethylene glycol, propylene glycol and dipropylene glycol as the sole polyhydric alcohol and (b) an ethylenically alpha unsaturated alpha, beta dicarboxylic acid selected from the class consisting of maleic and fumaric acids as the sole polycarboxylic acid, the latter acids being the sole source of unsaturation in the aforesaid acidic polyester and there being present from 1 to 2 mols of the dicarboxylic acid per mol of dihydric alcohol, and (2) a complex epoxide resin containing epoxy groups and comprising a polyether derivative obtained by reacting epichlorohydrin with a polyhydric phenol containing at least two phenolic hydroxy groups, there being present in the reaction mixture from 0.8 to 1.2 polyester acid equivalents for each equivalent of epoxide.

2. The product of reaction under heat of a mixture of ingredients consisting essentially of (1) an acidic polymerizable polyester having an acid number between 75 and 200 and containing a free carboxyl group, and comprising the product of reaction of a mixture of ingredients consisting essentially of (a) ethylene glycol and (b) maleic anhydride, the latter maleic anhydride being the sole polycarboxylic acid and the sole source of unsaturation in the aforesaid acidic polyester, and there being present from 1 to 2 mols of the maleic anhydride per mole of ethylene glycol, and (2) a complex epoxide resin containing epoxy groups and comprising a polyether derivative obtained by reacting epichlorohydrin with a polyhydric phenol containing at least two phenolic hydroxy groups, there being present in the reaction mixture from 0.8 to 1.2 polyester acid equivalents for each equivalent of epoxide.

3. The product of reaction under heat of a mixture of ingredients consisting essentially of (1) an acidic polymerizable polyester having an acid number between 75 and 200 and containing a free carboxyl group, and comprising the product of reaction of a mixture of ingredients consisting essentially of (a) ethylene glycol and (b) fumaric acid, the latter fumaric acid being the sole polycarboxylic acid and the sole source of unsaturation in the aforesaid acidic polyester, and there being present from 1 to 2 mols fumaric acid per mole of ethylene glycol, and (2) a complex epoxide resin containing epoxy groups and comprising a polyether derivative obtained by reacting epichlorohydrin with a polyhydric phenol containing at least two phenolic hydroxy groups, there being present in the reaction mixture from 0.8 to 1.2 polyester acid equivalents for each equivalent of epoxide.

4. The process which comprises (a) forming a mixture of ingredients consisting essentially of (1) an acidic polymerizable polyester having an acid number between 75 and 200 and containing a free carboxyl group, and comprising the product of reaction of a mixture of ingredients consisting essentially of (a) a dihydric alcohol selected from the class consisting of ethylene glycol, diethylene glycol, propylene glycol and dipropylene glycol as the sole polyhydric alcohol and (b) an ethylenically alpha unsaturated alpha, beta dicarboxylic acid selected from the class consisting of maleic and fumaric acids as the sole polycarboxylic acid, the latter acids being the sole source of unsaturation in the aforesaid acidic polyester and there being present from 1 to 2 mols of the dicarboxylic acid per mol of dihydric alcohol, and (2) a complex epoxide resin containing epoxy groups and comprising a polyether derivative obtained by reacting epichlorohydrin with a polyhydric phenol containing at least two phenolic hydroxy groups, there being present in the reaction mixture from 0.8 to 1.2 polyester acid equivalents for each equivalent of epoxide, and (b) thereafter heating the aforesaid mixture of ingredients until an intercondensed product is obtained.

5. The process which comprises (a) forming a mixture of ingredients consisting essentially of (1) an acidic polymerizable polyester having an acid number between 75 and 200 and containing a free carboxyl group, and comprising the product of reaction of a mixture of ingredients consisting essentially of (a) ethylene glycol and (b) maleic anhydride, the latter maleic anhydride being the sole polycarboxylic acid and the sole source of unsaturation in the aforesaid acidic polyester and there being present from 1 to 2 mols of the maleic anhydride per mol of ethylene glycol, and (2) a complex epoxide resin containing epoxy groups and comprising a polyether derivative obtained by reacting epichlorohydrin with a polyhydric phenol containing at least two phenolic hydroxy groups, there being present in the reaction mixture from 0.8 to 1.2 polyester acid equivalents for each equivalent of epoxide, and (b) thereafter heating the aforesaid mixture of ingredients until an intercondensed product is obtained.

6. The process which comprises (a) forming a mixture of ingredients consisting essentially of (1) an acidic polymerizable polyester having an acid number between 75 and 200 and containing a free carboxyl group, and comprising the product of reaction of a mixture of ingredients consisting essentially of ethylene glycol and fumaric acid, the latter fumaric acid being the sole polycarboxylic acid and the sole source of unsaturation in the aforesaid acidic polyester, there being present from 1 to 2 mols of the fumaric acid per mol of the ethylene glycol, and (2) a complex epoxide resin containing epoxy groups and comprising a polyether derivative obtained by reacting epichlorohydrin with a polyhdric phenol containing at least two phenolic hydroxy groups, there being present in the reaction mixture from 0.8 to 1.2 polyester acid equivalents for each equivalent of epoxide, and (b) thereafter heating the aforesaid mixture of ingredients until an intercondensed product is obtained.

7. The process which comprises (A) interacting under heat a mixture of ingredients consisting essentially of (1) an acidic polymerizable polyester having and acid number between 75 and 200 and containing a free carboxyl group and comprising the product of reaction of a mixture of ingredients consisting essentially of (a) a dihydric alcohol selected from the class consisting of ethylene glycol, diethylene glycol, propylene glycol and dipropylene glycol as the sole polyhydric alcohol and (b) an ethylenically alpha unsaturated alpha, beta dicarboxylic acid selected from the class consisting of maleic and fumaric acids as the sole polycarboxylic acid, the latter acids being the sole source of unsaturation in the aforesaid acidic polyester and there being present from 1 to 2 mols of the dicarboxylic acid per mol of the dihydric alcohol, and (2) a complex epoxide resin containing epoxy groups and comprising a polyether derivative obtained by reacting epichlorohydrin with a polyhydric phenol containing at least two phenolic hydroxy groups, there being present in the reaction mixture from 0.3 to 1.2 polyester acid equivalents for each equiavlent of epoxide, (B) adding a terminally unsaturated copolymerizable organic compound to the reacted mixture of (A), and (C) thereafter heating the aforesaid mixture of ingredients with a free radical-producing catalyst until intercondensation and polymerization of the ingredients have taken place.

References Cited in the file of this patent

UNITED STATES PATENTS

| Number | Name | Date |
|---|---|---|
| 2,324,483 | Castan | July 20, 1943 |
| 2,591,539 | Greenlee | Apr. 1, 1952 |
| 2,626,223 | Sattler et al. | Jan. 20, 1953 |
| 2,646,410 | Kneisley | July 21, 1953 |

OTHER REFERENCES

Shell, Paint Oil and Chem. Rev., November 9, 1950, pp. 15–18, 48 and 49.

Cyanamid Resins for Specification Finishes, Am. Cyanamid Co., 1943, page 12.

Synthetic Resins for Coatings, Resinous Products and Chemical Co., 1947, page 42.